United States Patent [19]

McVey

[11] Patent Number: 4,977,795
[45] Date of Patent: Dec. 18, 1990

[54] RELATING TO A RATCHET MACHANISM

[75] Inventor: Carl McVey, Westcliff on Sea, United Kingdom

[73] Assignee: RWO (Marine Equipment) Limited, Essex, United Kingdom

[21] Appl. No.: 474,641

[22] Filed: Feb. 1, 1990

Related U.S. Application Data

[63] Continuation of Ser. No. 246,938, Sep. 18, 1988, abandoned, which is a continuation of Ser. No. 919,717, Oct. 16, 1986, abandoned.

[30] Foreign Application Priority Data

Oct. 18, 1985 [GB] United Kingdom ................. 8525706

[51] Int. Cl.$^5$ .......................... G05G 1/00; G05G 3/00
[52] U.S. Cl. ................................. 74/575; 74/577 R; 74/577 M; 242/223; 188/63; 192/43.1
[58] Field of Search ................. 74/505, 506, 527, 504, 74/575, 500.5, 501.5 R; 254/376; 242/213, 219, 84.1 R; 188/82.2, 82.3, 31, 265, 60, 69, 82.7; 192/43.1

[56] References Cited

U.S. PATENT DOCUMENTS

| | | | |
|---|---|---|---|
| 2,593,700 | 4/1952 | Rosner | 242/219 |
| 2,708,555 | 5/1955 | Heinemann et al. | 188/82.7 |
| 2,964,257 | 12/1960 | Hull | 188/82.7 |
| 2,976,959 | 3/1961 | Husted | 188/82.7 |
| 2,984,433 | 5/1961 | Clark | 242/213 |
| 3,540,306 | 11/1970 | Nurmse | 242/84.1 R |
| 3,829,041 | 8/1974 | Nepote | 242/219 |
| 3,939,729 | 2/1976 | Brockelsby | 188/82.7 |
| 3,979,081 | 9/1976 | Miyamae | 242/219 |
| 4,201,355 | 5/1980 | Ruin | 242/84.1 R |
| 4,496,115 | 1/1985 | Kreft et al. | 242/84.1 R |

FOREIGN PATENT DOCUMENTS

| | | | |
|---|---|---|---|
| 526780 | 6/1956 | Canada | 242/84.1 R |
| 463099 | 4/1951 | Italy | 188/82.2 |
| 1009371 | 4/1983 | U.S.S.R. | 242/84.1 R |
| 1162323 | 8/1969 | United Kingdom . | |
| 1188445 | 4/1970 | United Kingdom . | |
| 1261341 | 1/1972 | United Kingdom . | |
| 1312819 | 4/1973 | United Kingdom . | |
| 2096872 | 10/1982 | United Kingdom . | |

Primary Examiner—Vinh T. Luong
Attorney, Agent, or Firm—Parmelee, Miller, Welsh & Kratz

[57] ABSTRACT

A ratchet mechanism comprising a rotatable member incorporating a toothed periphery, the rotatable member being suitably mounted to allow free rotation thereof, a pawl incorporating apparatus for engaging the toothed periphery, the pawl being suitably mounted to permit movement thereof from a position in which the pawl allows said rotatable member to rotate freely in either direction of rotation to a position in which the pawl prevents said rotatable member from rotating in one direction, and selectively operable apparatus to move the pawl between said positions, said selectively operable apparatus incorporating an over-dead-center spring arrangement to bias the pawl into the selected position.

7 Claims, 4 Drawing Sheets

RELATING TO A RATCHET MACHANISM

This is a continuation of copending application Ser. No. 07/246,938, filed on Sept. 19, 1988, which is a continuation of U.S. Ser. No. 06/919,717, filed on Oct. 16, 1986, now abandoned.

BACKGROUND OF THE INVENTION

The present invention relates to a ratchet mechanism and more particularly to a ratchet mechanism which, when operative, permits a rotatable member to rotate freely in one direction whilst locking the rotatable member against rotation in the opposite direction.

Pulley blocks are widely used and commonly comprise a pulley wheel or sheave mounted by way of ball bearings between two block cheeks. It has been proposed to provide such a pulley block with a ratchet. In a typical pulley block of this type a sheave has a toothed inner periphery and the ratchet mechanism includes an engaging member suitable for engaging this toothed inner periphery. Some form of switch is usually provided to move the engaging member between an engaged position and a disengaged position. The switch usually projects through an aperture in the block cheek and may be operated manually.

Such a pulley block incorporating a ratchet mechanism may be used to facilitate raising or moving heavy objects or resistive loads where it is obviously undesirable for the object being moved to slip back in the opposite direction to the desired direction of movement. Such blocks are used on yachts to raise and lower the sails. Thus, it will be appreciated that it is highly undesirable for the member which engages the toothed inner periphery of the sheave to accidentally become disengaged from the toothed inner periphery during operation.

BRIEF SUMMARY OF THE INVENTION

According to the present invention there is provided a ratchet mechanism comprising a rotatable member incorporating a toothed periphery, means mounting said rotary member to allow free rotation thereof, a pawl incorporating means for engaging said toothed periphery, means for mounting said pawl adapted to permit said pawl to move from a position in which said pawl allows said rotatable member to rotate freely in either direction of rotation, to a position in which said pawl prevents said rotatable member from rotating in one direction, and selectively operable means to move the pawl between the said positions, said selectively operable means incorporating on over-dead-centre spring arrangement to bias the pawl into the selected position.

Preferably the rotatable member comprises a sheave or reel rotatably mounted in an appropriate housing.

Conveniently the rotatable member is annular and the said toothed periphery thereof is an inner periphery thereof.

Advantageously the pawl is rotatably mounted in position on said housing, the pawl having a portion configured to engage with the toothed periphery of the rotatable member.

Preferably the selectively operable means comprises a rotatable switch member which can be rotated to actuate the over-dead-centre spring arrangement to bias the pawl into the selected position.

Conveniently the rotatable switch member has mounted thereon a spring member having two arms which lie in respective intersecting planes, the projection of the arms into one plane being parallel, the arms being interconnected at one end thereof, the free ends of the arms being mounted on the rotatable switch member.

Advantageously the interconnected ends of said arms are located in a slot formed in the pawl.

Conveniently the switch body incorporates a knurled or corrugated portion adapted to be acuated by a finger or thumb.

The invention also relates to a pulley block or fishing reel incorporating such a ratchet mechanism.

INTRODUCTION OF THE DRAWINGS

In order that the invention may be more readily understood, and so that further features thereof may be appreciated, the invention will now be described by way of example with reference to the accompanying drawings in which.

DESCRIPTION OF PREFERRED EMBODIMENT

Figures 1, 2:
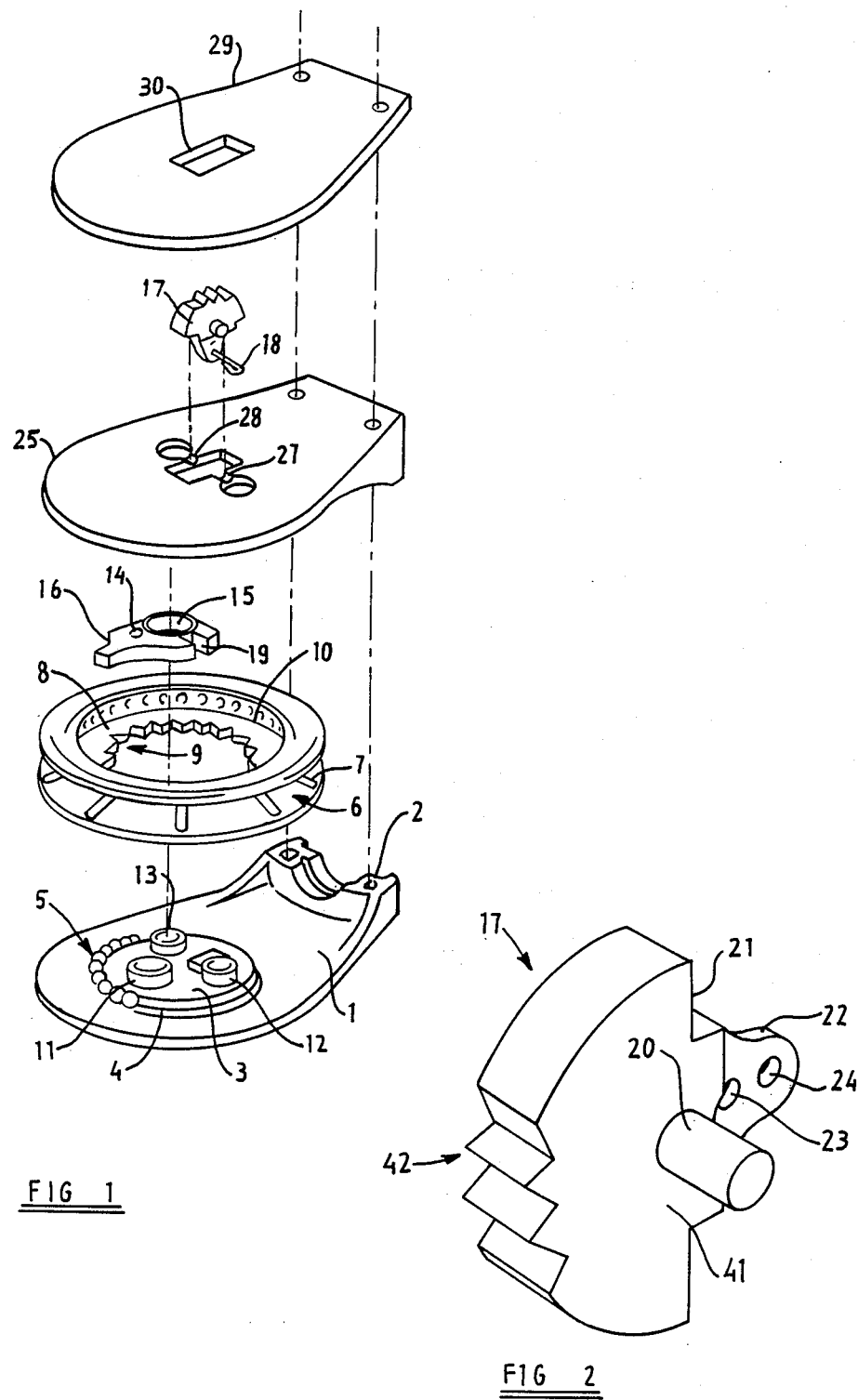
FIG. 1 is a diagrammatic exploded view of pulley block incorporating a ratchet mechanism according to the present invention.
FIG. 2 is a side elevation of the switch body shown in FIG. 1.

Referring to the accompanying drawings, a pulley block P provided with a ratchet mechanism in accordance with the present invention comprises two opposed cheeks 1 and 25 illustrated in FIG. 1.

The illustrated cheek may be formed as mouldings of an appropriate plastic material. Cheek 1 is provided, at one end, with means 2 adapted to engage a swivel, or the like.

In a central region of the block cheek is a raised circular area 3, and the junction region 4 between the periphery of the raised circular area 3 and the remaining face of the cheek 1 is a designed to receive a plurality of balls 5 which constitute a ball race. The ball race is adapted to cooperate with a sheave body 6.

The sheave body 6 is an annular body having an outer peripheral groove 7 adapted to receive a rope or the like. A radially inwardly extending web 8 is provided on the axis of symmetry of the sheave 6, the inner periphery of the web 8 being toothed, g.

The sheave body 6 cooperates with a pair of ball races, such as ball race 5, adjacent the junction 10 of the web 8 and the outer annular body. The underside of the sheath body (not shown) cooperates with the ball race 5, and the side of the sheath body 6 visible in FIG. 1 cooperates with the ball race (not shown) provided on the other block cheek 25.

The central raised portion 3 of the block cheek carries three upstanding hollow spigots 11, 12, 13. The hollow spigot 11 is adapted to receive a rivet or the like which serves to join the various components of the block together. The spigot 13 acts as a pivotal support for a pawl 14. The pawl 14 has a bore 15 therein adapted to be engaged on the spigot 13, so that the pawl 14 may rotate about the axis of the spigot 13, and the pawl 14 also has a portion 16 configured to engage with the teeth 9 provided on the sheave 6.

A switch mechanism is provided which is constituted by a switch body 17 which has mounted thereon a planar spring 18 (which will be described hereinafter in greater detail), the spring 18 being adapted to engage with a slot 19 formed in the body of the pawl 14.

The switch may be actuated so that the pawl is in an engaged position with the pawl teeth, and when the pawl is engaged in this way, the sheave body may rotate only in one direction with a ratchet action. However, the switch body may also be moved to an alternative position in which the pawl body is disengaged from the teeth 9 provided on the sheave body 6, and the sheave is then free to rotate.

The block would have an upper block cheek mounted in position above the sheave body, and the switch body 17 would be pivotally mounted on the upper block cheek.

The switch body 17 is illustrated in greater detail in FIG. 2.

The switch body consists of a semi-circular disc 41 part of the outer circular periphery of which is knurled or corrugated 42 to provide a good grip. Two protruding trunnions 20 are provided, on opposite sides of the semi-circular disc, adjacent the midpoint of the linear part 21 of the periphery of the semi-circular disc 17, the trunnions being so located that the trunnions define an axis about which the switch body may be rotated, within the plane of the disc.

Projecting rearwardly from the midpoint of the linear edge of the disc is a rearwardly extending arm 22, the arm defining two bores therethrough 23, 24, the bores being spaced apart, but being substantially co-aligned with the trunnions.

Figure 3:
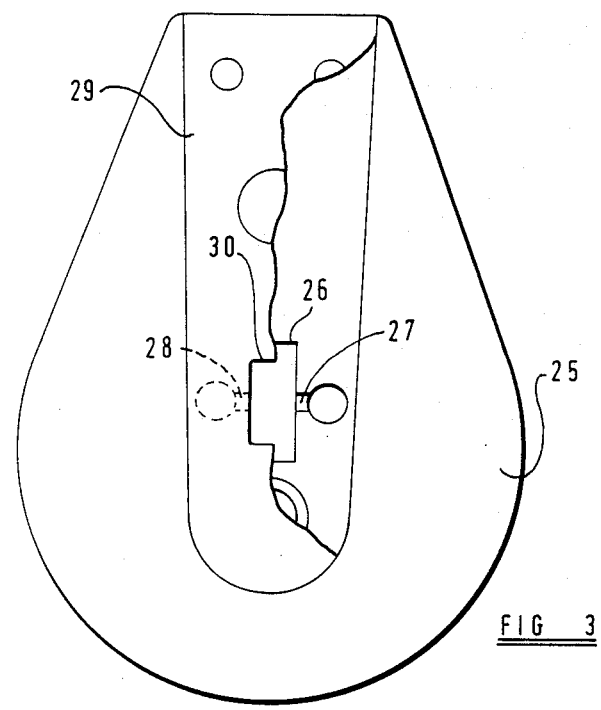
FIG. 3 is a plan view of the block cheek of FIG. 1 showing the pawl in position.

FIG. 3 illustrates the top cheek 25 of the illustrated block. It can be seen that this cheek defines an aperture 26 of rectangular configuration dimensioned to receive the switch body 17. Two recesses 27, 28 are provided adjacent the midpoints of the two long sides of this rectangular aperture 26, these recesses being dimensioned to receive the trunnions 20 of the switch body 17. A metal plate 29, having a rectangular aperture 30 therein may be located in position on the cheek with the aperture 30 coaligned with the aperture 26, and in this way the trunnions can be retained within the recesses 27, 28.

If the switch member is mounted in position in this way the knurled or corrugated portion of the switch member will be accessible through the aperture 30, so that the switch member may be readily manipulated.

Figure 4:
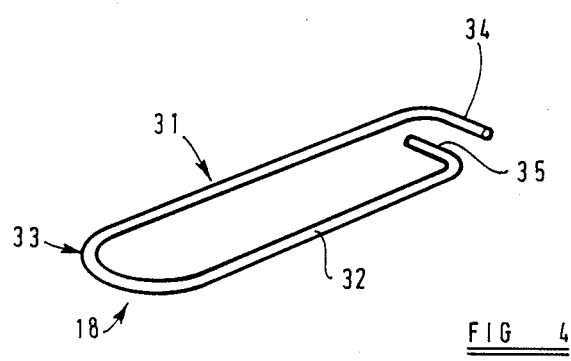
FIG. 4 is a perspective view of the "planar" spring shown in FIG. 1.

The switch member is associated with a so-called planar spring 18, which is illustrated more clearly in FIG. 4. The planar spring comprises two arm portions 31, 32 which are interconnected by an arcuate connecting portion 33. The arm portion 31 has an inwardly bent terminal portion 34, at its free end whereas the arm portion 32 has an oppositely directed inwardly bent terminal portion 35, at its free end.

The planar spring of FIG. 4 may be manipulated so that the inwardly bent terminal portion 34 is inserted in the bore 23 provided on the switch member 17, whereas the inwardly directed terminal portion 35 is inserted in the bore 24 on the switch body 17. The spacing between the bores 23 and 24 is slightly greater than the spacing between the portions 34 and 35 when the spring is released. As a consequence the spring adopts a position in which the two arm portions, although appearing to be substantially parallel when the spring is viewed from above, do not lie in a common plane. The planar spring will then be constrained to lie in a position either above or below a plane defined by the trunnion 20, the bore 23 and the bore 24. If the spring 18 is lying above that plane, it may be moved, through a "dead-centre" position until it lies below the plane. The spring may then, if desired, be returned through the "dead-centre" position to its initial position.

Figure 5:
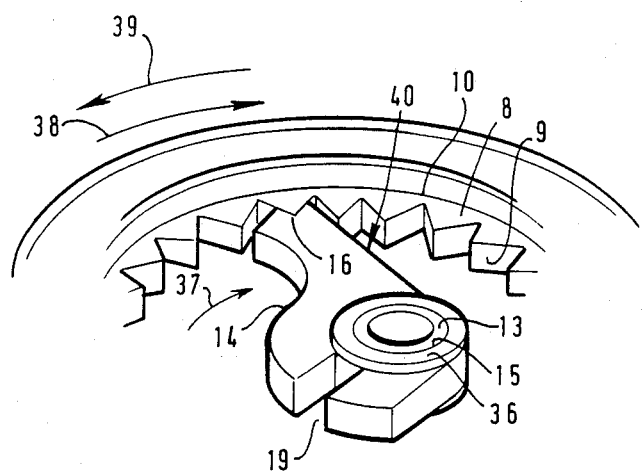
FIG. 5 is a perspective view illustrating the pawl in an engaged position.

Referring now to FIG. 5 the pawl member 14 and the web 8 carrying the teeth 9 are more clearly illustrated.

It can be seen that the pawl member 14 is a generally elongate member mounted, adjacent one end thereof, by means of a bore 15, on the spigot 13. The upper surface of the pawl member 14 surrounding the bore 15 is raised 36 to provide a bearing surface that can engage the adjacent block cheek to ensure that the pawl member 14 may rotate freely about the spigot 13.

The slot 19 adapted to receive the planar spring is formed in a widened portion of the pawl member.

It is to be understood that when the switch is moved appropriately the pawl will be spring biassed in a direction as illustrated by the arrow 37, so that the portion 16 of the pawl member 14 configured to engage with the teeth 9 does actually engage with the teeth 9. It can be seen that with the ratchet engaged in this direction the sheave body is prevented from rotating in a clockwise direction as illustrated by the arrow 38, but may rotate in the anti-clockwise direction as illustrate by the arrow 39. When the sheave body rotates in the anti-clockwise direction a tooth 9 engaging the surface 40 of the pawl body will tend to rotate the pawl against the spring bias that is biassing the pawl in the direction illustrated by the arrow 37, thus permitting the sheave 6 to rotate.

Figure 6:
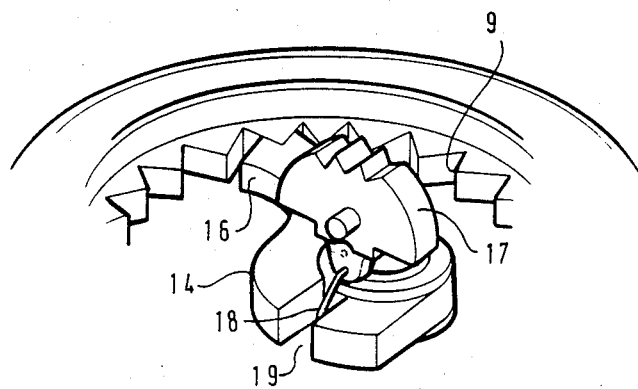
FIG. 6 is a view corresponding to FIG. 5 but also illustrating the switch.

FIG. 6 corresponds to FIG. 5 but additionally illustrates the switch member 17 in position.

It can be seen that the switch member is located effectively above the slot 19 formed in the pawl 14. As can be seen the planar spring 18 is in a position towards the left, as seen in FIG. 6, and when in this position the planar spring biasses the portion 16 of the ratchet member into contact with the teeth 9. However, the switch body 17 may be manipulated, and if it is manipulated appropriately the springs 18 will move, or "flip", through its "dead-centre" position, thus moving the spring to its other position in which it is to the right, as shown in FIG. 6, and it will be understood that when the spring enters this position it moves the pawl in a rotational manner about the axis defined by the spigot 13, thus disengaging the portion 16 of the pawl 14 from the teeth 9.

Figure 7:
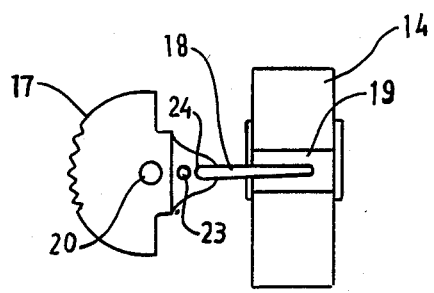
FIG. 7 is a side view illustrating the engagement of the "planar" spring with the pawl and the switch body.
Figure 8:
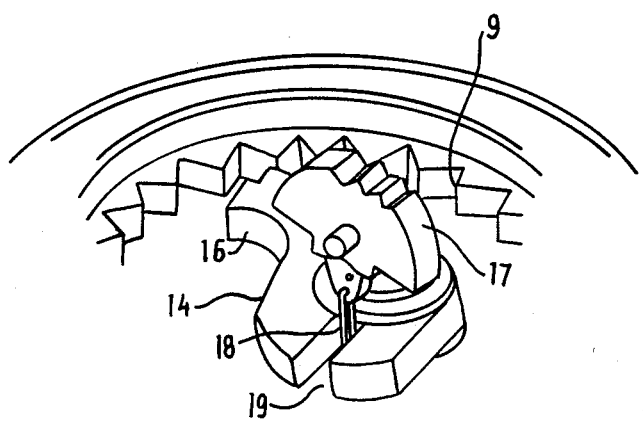
FIG. 8 is a perspective view of the pawl in a disengaged position.

FIG. 7 is a side view illustrating the "dead-centre" position of the spring 18 engaged in the slot 19 of the pawl 14.

Whilst the invention has been described with specific reference to a pulley block provided with a ratchet mechanism in accordance with the invention it is to be understood that a ratchet mechanism in accordance with the present invention may find many other applications. For example the ratchet mechanism may be of use in a fishing line reel or the like.

What is claimed is:

1. A ratchet mechanism comprising an annular rotatable member incorporating an inner toothed periphery, means for mounting said rotatable member to allow free rotation thereof, a pawl incorporating means for engaging said toothed periphery, means for mounting said pawl adapted to permit said pawl to move from a disengaged position in which said pawl allows said rotatable member to rotate freely in either direction of rotation, to an engaged position in which said pawl prevents said rotatable member from rotating in one direction, and selectively operable means to move the pawl between the said positions, said selectively operable means incorporating a single over-dead-centre spring arrangement which serves, when the pawl is in the disengaged position, to bias the pawl to said disengaged position and which serves, when the pawl is in the engaged position, to bias the pawl to said engaged position.

2. A ratchet mechanism according to claim 1 wherein the selectively operable means comprises a rotatable switch member which can be rotated to actuate the over-dead-centre spring arrangement to bias the pawl into the selected position.

3. A mechanism according to claim 2 wherein the switch body member incorporates a knurled portion to facilitate actuation by a finger or thumb.

4. A ratchet mechanism comprising an annular rotatable member incorporating an inner toothed periphery, means for mounting said rotatable member to allow free rotation thereof, a pawl incorporating means for engaging said toothed periphery, means for mounting said pawl adapted to permit said pawl to move from a disengaged position in which said pawl allows said rotatable member to rotate freely in either direction of rotation, to an engaged position in which said pawl prevents said rotatable member from rotating in one direction, and selectively operable means to move the pawl between the said positions, said selectively operable means comprising a switch member and a spring member mounted upon the switch member, the spring member having two arms which lie in respective intersecting planes, the projection of the areas into one plane being parallel, the arms being interconnected at one end thereof, the free ends of the arms being mounted on the switch member, the arrangement being such that switch member is operable to move the spring member in an over-dead-centre manner, such that a single spring member biases the pawl into the selected position.

5. A ratchet mechanism according to claim 4 wherein the rotatable member comprises a sheave rotatably mounted between two cheeks.

6. A ratchet mechanism according to claim 2 wherein the pawl is rotatably mounted in position on said housing, the pawl having a portion configured to engage with the toothed periphery of the rotatable member.

7. A mechanism according to claim 4 wherein the interconnected ends of said arms are located in a slot formed in the pawl.

* * * * *